May 12, 1959  J. J. NICHTA  2,885,765
MACHINE TOOL

Filed Sept. 30, 1954

INVENTOR.
JOHN J. NICHTA
BY Hudson, Boughton,
Williams, David & Hoffmann
ATTORNEYS

INVENTOR.
JOHN J. NICHTA

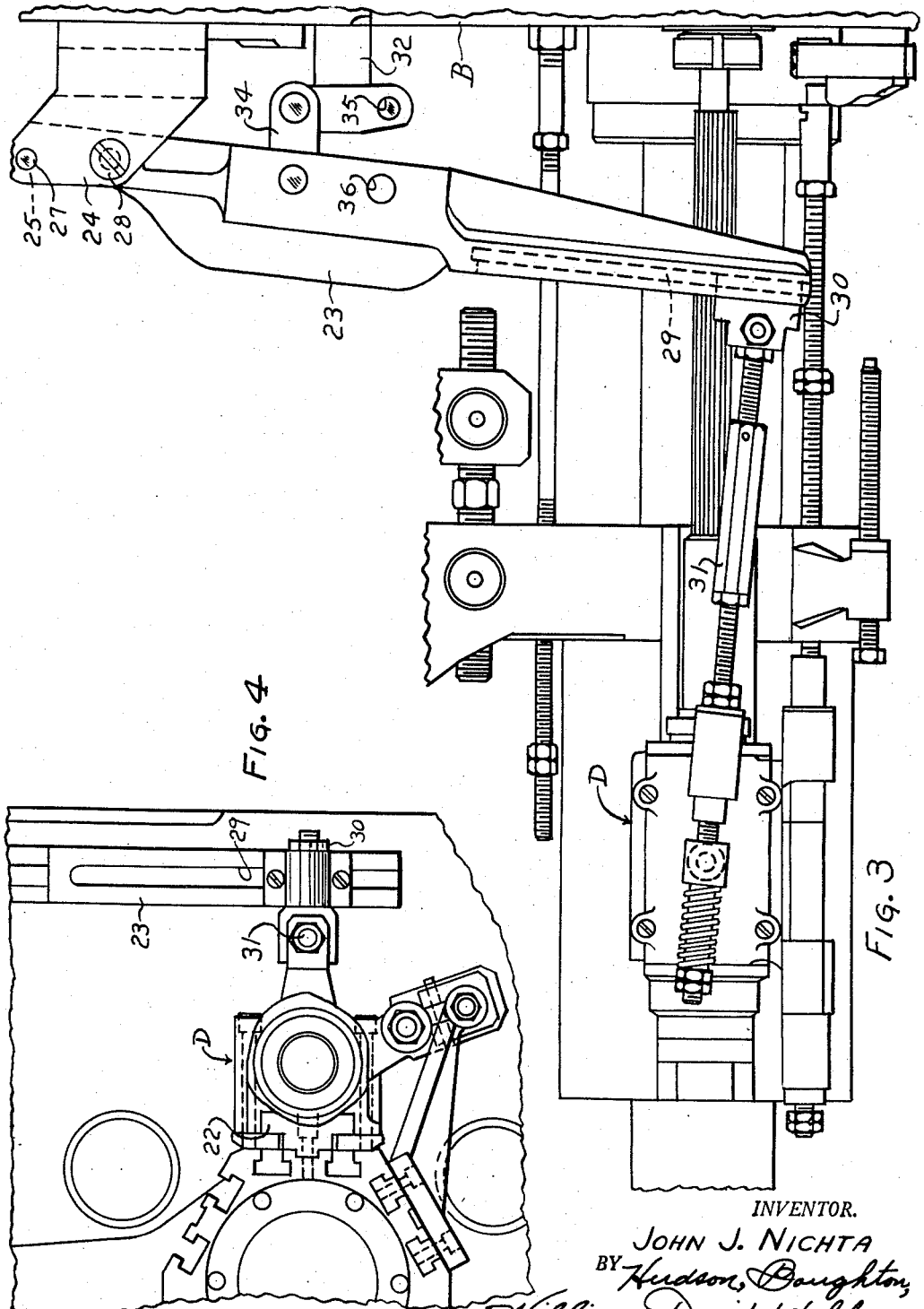

INVENTOR.
JOHN J. NICHTA

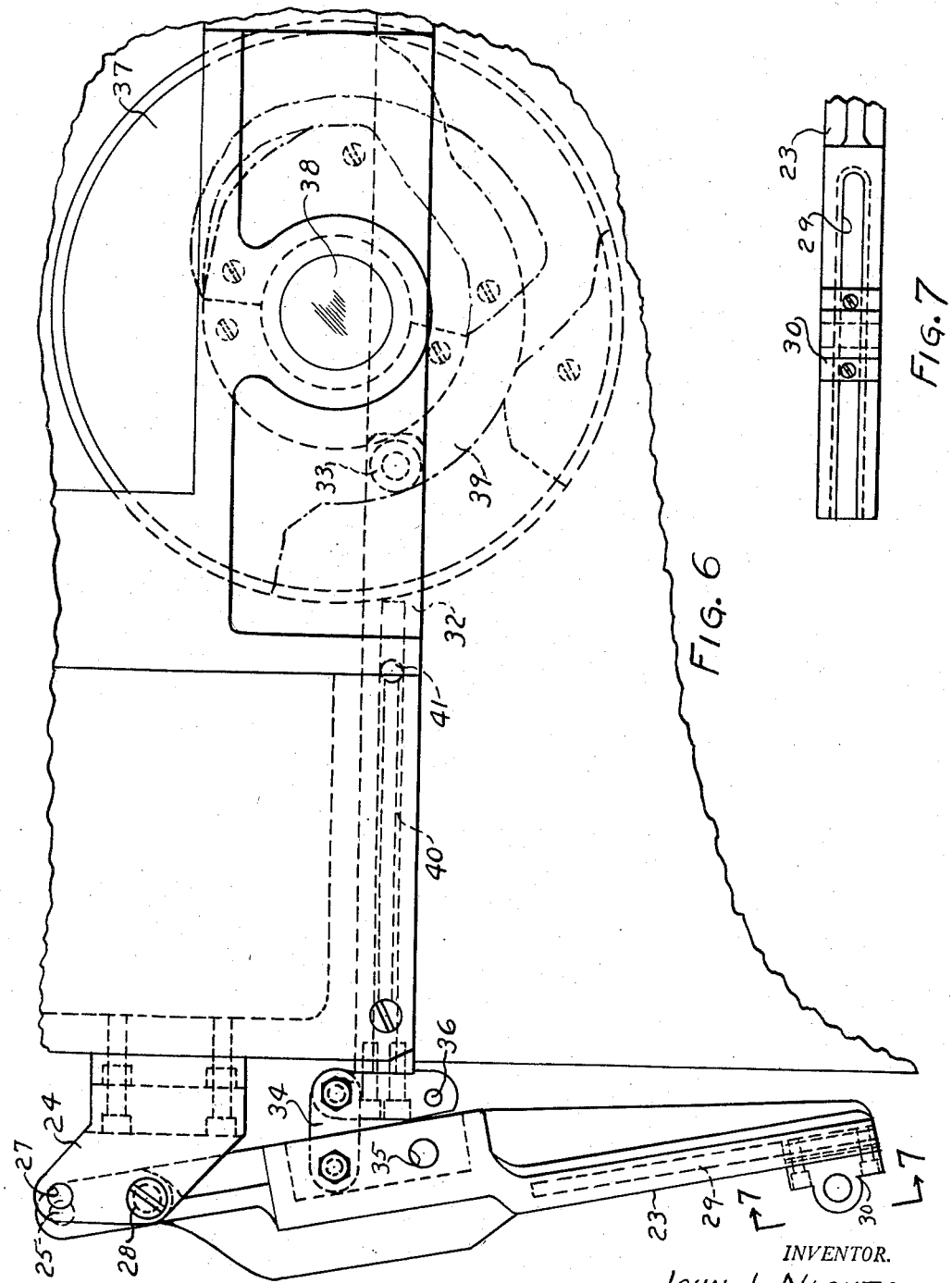

United States Patent Office 2,885,765
Patented May 12, 1959

2,885,765
MACHINE TOOL

John J. Nichta, Parma, Ohio, assignor to The Warner & Swasey Company, Cleveland, Ohio, a corporation of Ohio Application September 30, 1954, Serial No. 459,261

3 Claims. (Cl. 29—41)

The present invention relates to a machine tool and, more particularly, to a multiple spindle machine tool having spindles which are diametrically opposed.

The principal object of the present invention is the provision of a new and improved machine tool having a plurality of diametrically opposed spindles circumferentially spaced in a spindle carrier and adapted to clamp and rotate work to be operated upon by tools supported on cross slides at tool stations adjacent each spindle position, the machine being provided with auxiliary slides at diametrically opposed tool stations and actuating means therefor whereby the flexibility and uses of the machine is substantially increased.

The invention resides in certain constructions, combinations and arrangements of parts, and further objects and advantages will be apparent to those skilled in the art to which it relates from the following description of the preferred embodiment described with reference to the accompanying drawings forming a part of this specification in which:

Fig. 3 is a fragmentary front elevational view showing the auxiliary slide mechanism in the 6th position of the machine;

Fig. 4 is a fragmentary elevational view from the left-hand side of Fig. 3;

Fig. 6 is a fragmentary view showing the cam mechanism for operating the auxiliary slide in the 6th position of the illustrated machine;

Fig. 7 is a view taken approximately along line 7—7 of Fig. 6; and

Figure 1:
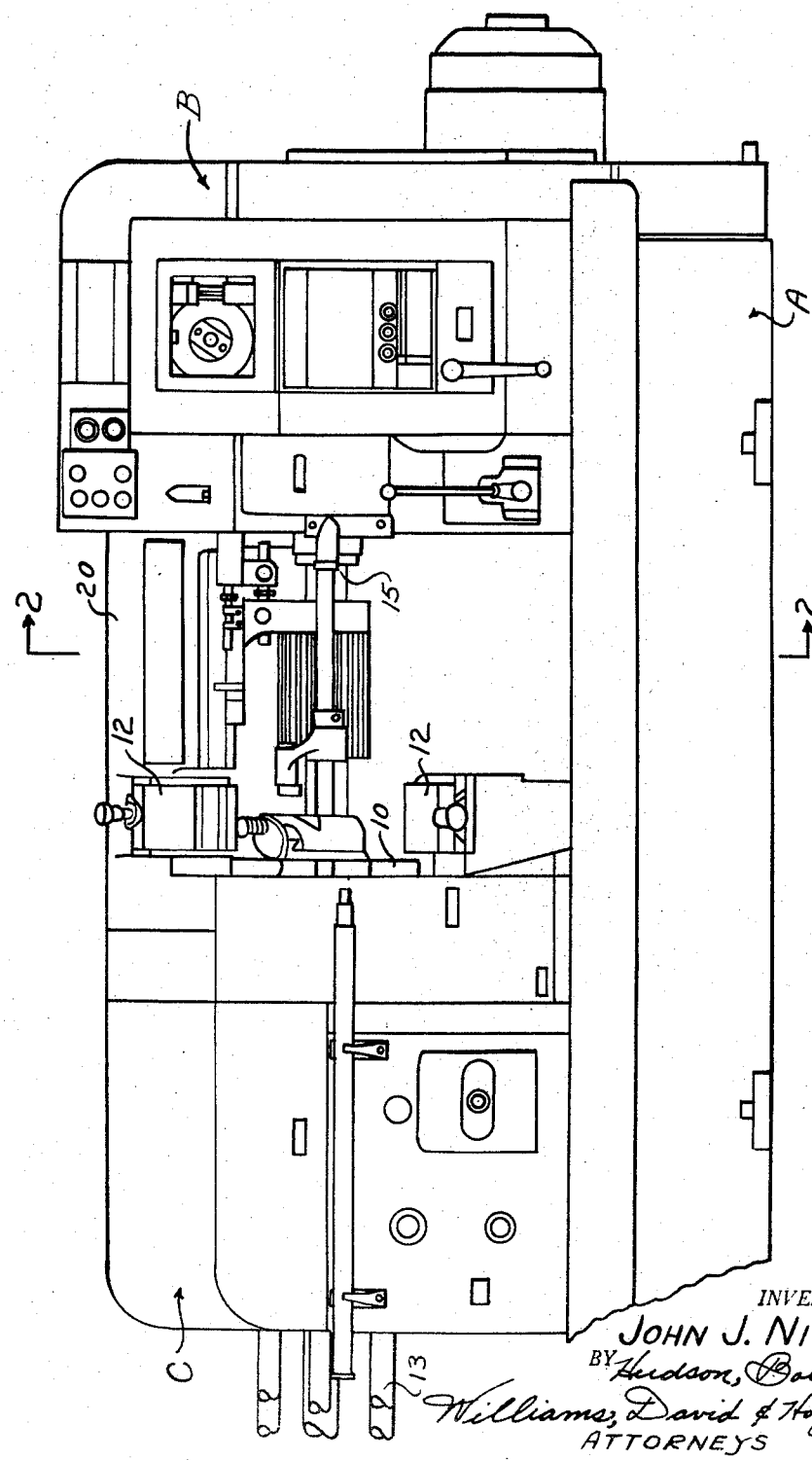
Fig. 1 is a front elevational view of a machine tool embodying the present invention.

The present invention is susceptible of use in various types of multiple spindle machine tools having an even number of circumferentially spaced spindles and, for purposes of illustration, has been shown as embodied in a six-spindle automatic machine for machining bar stock.

Referring to the drawings, the machine illustrated comprises a bed A having a supporting column B at one end and a headstock C at the other end. The headstock C includes a spindle carrier 10 which carries six circumferentially spaced, rotatable work spindles. The work spindles are each provided with a bore and are adapted to have bar stock fed therethrough and clamped therein and the bar stock is rotated and operated upon by tools supported on cross slides 12 mounted adjacent each spindle position. The bar stock 13 is adapted to be supported by and fed from bar stock carriers not shown, extending rearwardly of the headstock C. The mechanism for feeding the bar stock outwardly of the spindles may be of conventional construction.

Figure 2:
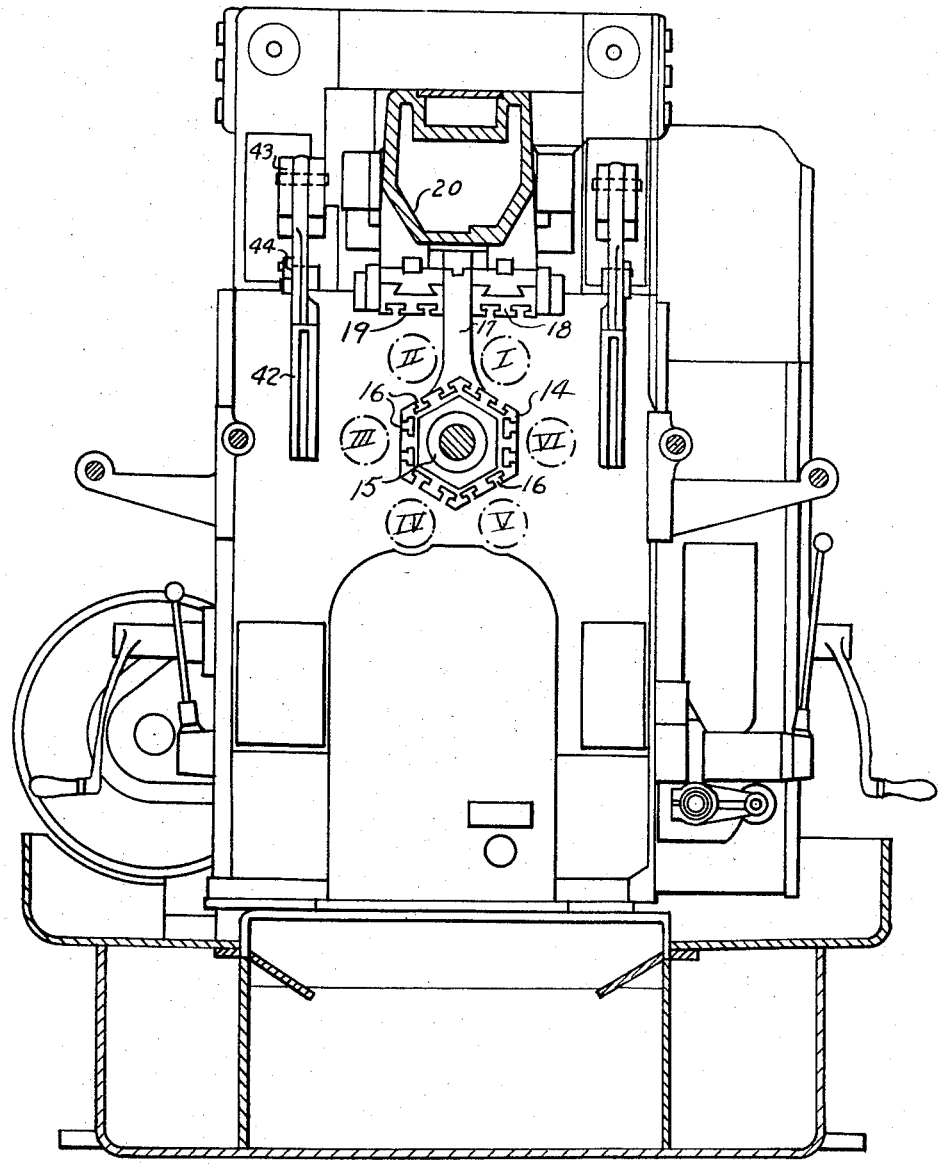
Fig. 2 is a view taken approximately along line 2—2 of Fig. 1.

The spindle carrier 10 is indexed by suitable mechanism of conventional construction to sequentially move the spindles to the various spindle positions adjacent the tool stations. The six stations to which each work spindle may be indexed in the illustrated machine are indicated by dotted circles in Fig. 2, with the spindle position in the upper right-hand quadrant being arbitrarily designated as the first station, with the others numbered in sequence. The machine preferably has mechanism for feeding bar stock outwardly of the spindles at the third and sixth spindle positions, as well as a mechanism for severing the bar at both of these positions as disclosed and claimed in my copending application, Serial No. 444,061, filed July 19, 1954.

The details of structure of the machine thus far described are not necessary for an understanding of the present invention and therefore have been omitted for the sake of clarity.

A central hexagon tool slide 14 is slidably mounted on a supporting member 15 extending horizontally between the headstock C and column B and is adapted to support tools for operating upon bar stock at the various stations. The faces of the tool slide 14 are provided with T-slots 16 for mounting the tools on the hexagon tool slide. The hexagon tool slide is moved longitudinally of the machine by actuating mechanism to be further described hereinafter which is connected to an arm 17 extending upwardly from the central slide 14.

As is conventional in multiple spindle machines, front and rear auxiliary longitudinal slides 18, 19, respectively, are mounted on a supporting beam 20 extending between the headstock C and column B above the member 15. The auxiliary slides 18, 19 in the illustrated embodiment are adapted to support tools for operating on work in the 1st and 2nd positions and are moved longitudinally by mechanism to be described hereinafter.

According to the present invention, slide actuating mechanisms are also provided for longitudinally moving tools, such as reaming and cutting tools, supported on the hexagonal tool slide 14 in the 3rd, 4th, 5th and 6th positions so that the same operation may be performed at diametrically opposed stations. The mechanisms for actuating the tools supported on the central tool slide 14 in the 3rd and 6th positions are the same and, therefore, the mechanism for the 6th position only will be described in detail.

Referring to Figs. 3 and 4, a thread-cutting attachment D is shown mounted on a slide 22 supported on a support mounted on the face of the central tool slide 14 in the 6th position. The attachment is moved longitudinally by an auxiliary slide actuating mechanism comprising an actuating lever 23 pivotally connected at its upper end to a bracket 24 mounted on the column B. The upper end of the lever is provided with a pair of vertically displaced openings, or holes 25, to provide an adjustment for the effective length of the pivoted lever. The bracket 24 is provided with corresponding openings 27 and the lever is pivoted to the bracket by a bolt 28 adapted to be received by one set of the aligned openings in the bracket 24 and the lever.

The lower end of the actuating lever 23 is provided with a T slot 29 for adjustably mounting a block 30 connected to one end of actuating rod 31, the other end of the actuating rod 31 being connected to the threading tool. The adjustment of the block 30 along the slot 29 permits a further adjustment of the throw of the lever and the corresponding position of the tool along the central tool slide 14. The illustrated thread-cutting tool is of conventional construction as well as the manner of mounting it on the central tool slide 14 and, therefore, the tool and its support will not be described in detail.

The actuating lever 23 is moved about its pivot by cam mechanism located in the column B and connected to the lever 23 by means of a sliding bar 32 mounting a cam follower 33 at one end, and connected by a link 34 to the lever 23 at its other end. The link 34 is pivotally secured to both the sliding bar 32 and the lever 23. In order to provide additional adjustability for the throw of the lever, the link 34 may be shifted from the position shown in Fig. 6 to a second position where it will have its opposite ends connected to the lever 23 and the bar 32 respectively, by bolts passing through aperture 35 in the lever 23 and aperture 36 in the bar 32.

The bar 32 is moved longitudinally to actuate the lever 23 by a cam 37 fixed to a cam shaft 38 journally supported in the column B and rotated in timed relation to the rotation of the spindles. The cam 37 has a rear cam face 39 adapted to cooperate with the cam follower 33 on the bar 32 which is biased into the side of the cam groove by means of a tension spring 40 secured intermediate the column B and a pin 41 mounted on the inner end of the bar 32. As the cam 37 is rotated, the cam face imparts the desired movement to the bar 32 to move the actuating lever 23 and in turn the tool mounted on the auxiliary slide supported on the central tool slide 14 in the manner desired to perform an operation on the bar stock in the sixth position.

Figure 5:
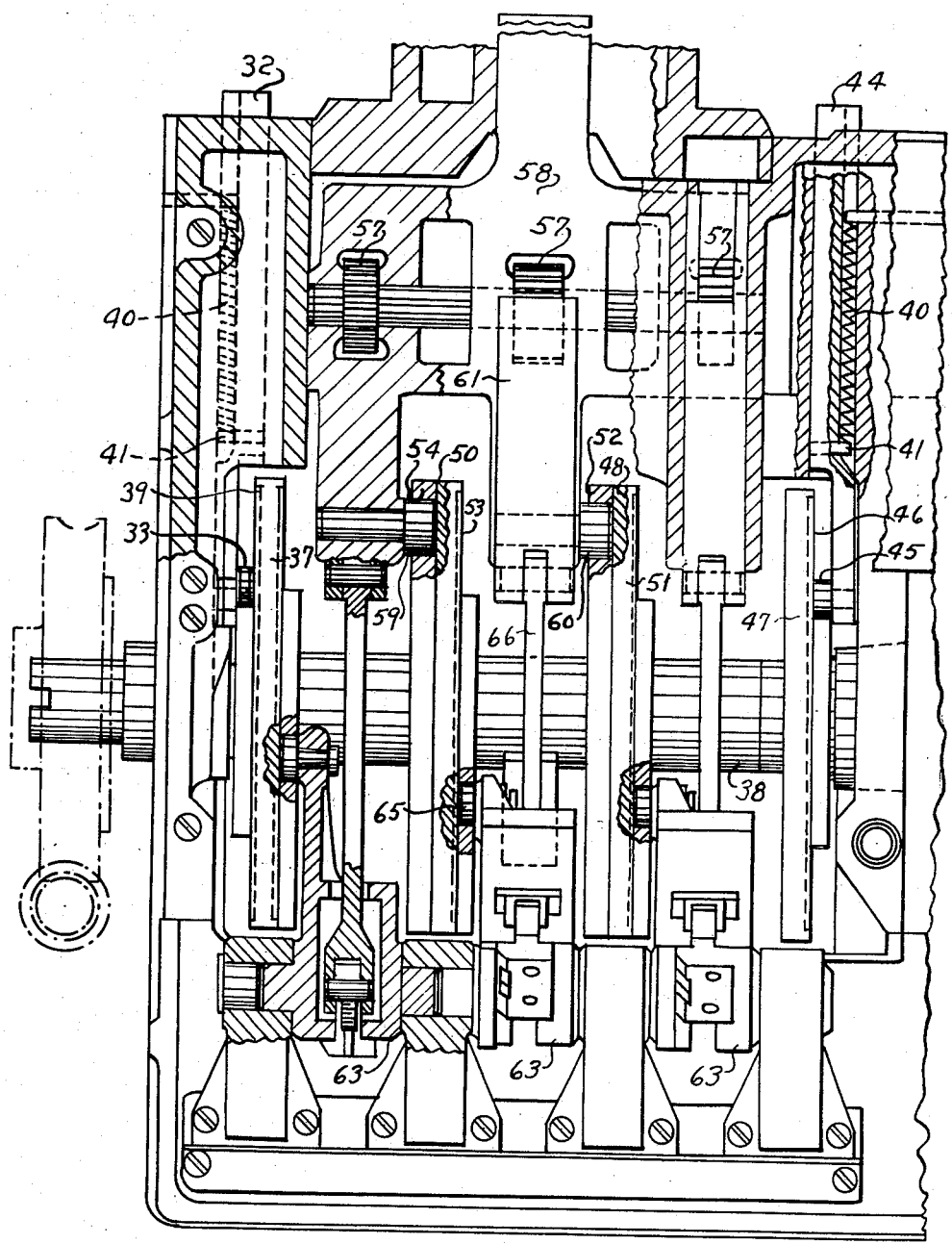
Fig. 5 is a fragmentary view with parts broken away showing the cam mechanism for operating the auxiliary slides.

An auxiliary slide actuating mechanism is provided for the third position which is similar in construction to the mechanism for the sixth position, and includes an actuating lever 42 adjustably secured to the column B by a bracket 43. The lever 42 is moved by a bar 44 adjustably connected thereto intermediate its ends and having a cam follower 45 mounted on its inner end (see Figs. 2 and 5). The cam follower 45 is adapted to cooperate with the rear face 46 of a cam 47 mounted on the opposite end of shaft 38 from the cam 37. The bar 44 is biased inwardly toward its operating cam in the same manner as bar 32.

Tools on the auxiliary longitudinal slides 18, 19 and the central tool slide 14 are moved longitudinally of the machine by mechanism actuated by cams mounted on the cam shaft 38 intermediate the cams 48, 50 and by the rear cam face of cam 37. The cam 48 has a rear cam face 51 for imparting a feed motion to the tools on the rear longitudinal slide 19, and a front face 52 for imparting a fast motion to the hexagon central tool slide 14. The cam 50 has a rear cam face 53 adapted to impart a feed motion to the hexagon central tool slide 14 and a front fast motion cam face 54. The cam 47 has a rear cam face 55 which is adapted to provide a feed motion for the front auxiliary longitudinal slide 18.

The mechanism interconnecting the cams 37, 48, 50, with the auxiliary longitudinal slides 18, 19, and the hexagon tool slide 14, is, in the illustrated embodiment, of the same construction and, in each case, comprises an upper rack bar and a lower rack bar in mesh with a pinion. The pinions, designated by the reference numeral 57, of the operating mechanism for the auxiliary longitudinal slides and the hexagon tool slide, are supported in a sliding block 58 supported in the column B, thereby providing floating pinions. The slide block 58 mounts cam followers 59, 60 which are adapted to cooperate with the fast motion cam faces 52, 54 to move the floating pinions in timed relation to the operation of the rest of the machine.

Figure 8:
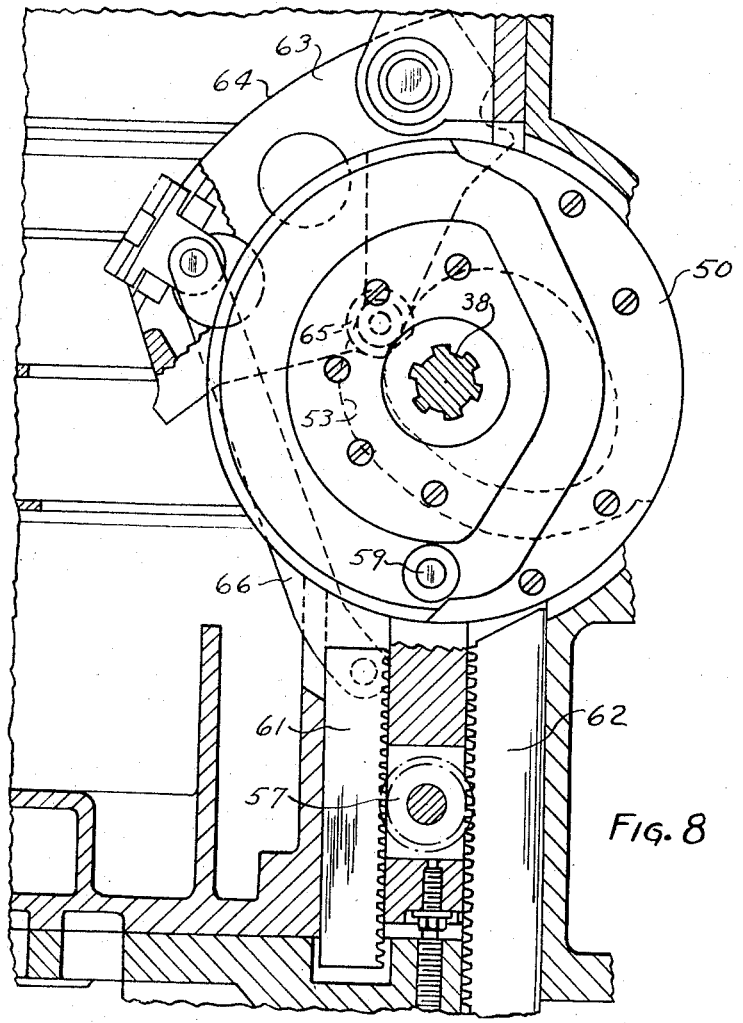
Fig. 8 is a view, partly schematic, of the mechanism for actuating the hexagon tool slide.

Inasmuch as the mechanism interconnecting the auxiliary longitudinal slides and the hexagon tool slide with the cams on the cam shaft 38 is the same for each slide, only one mechanism will be described in detail and it will be assumed that the mechanism described is the mechanism for operating the hexagon tool slide. Referring to Fig. 8, the mechanism as hereinbefore mentioned, comprises an upper rack-bar 61 in mesh with the floating pinion 57, and a lower rack bar 62 also in mesh with the pinion 57. The upper rack bar 61 is connected to a rocker arm 63 having an arcuate or quadrant surface 64 and adapted to be moved about its pivot by a cam follower 65 cooperating with the cam face 53 of the cam 50. The upper rack bar 61 is connected to the rocker arm 63 by means of a connecting member 66 adjustably located in a slot extending lengthwise of and concentric with the quadrant 64. The connecting member 66 is adjustable along the slot in the quadrant 64 to vary the length of the feed stroke.

The lower rack bar 62 is connected to the hexagon central tool slide, the movement thereof determining the movement of the slide. The operation of the mechanism interconnecting the cam shaft 38 and the tool slides 14, 18, 19, is as follows: When the tool slide is to be moved forward at a rapid rate, the upper rack bar 61 is held in one position and the pinion 57 is moved along the rack bar 61 while in mesh thereof by the fast motion cams to cause the lower rack bar to move toward the left, as the mechanism is viewed in Fig. 8. Upon completion of the fast motion approach stroke, the pinion is held in its position, which is its extreme left-hand position, and the upper rack bar moved to the right, as the mechanism is viewed in Fig. 8, by the rocking movement of the quadrant caused by the feed cams to produce the feed stroke. When the feed stroke is completed, the fast motion cams and the feed cams cause the upper rack bar to move toward the left and the floating pinion to move toward the right to produce a fast motion return movement of the lower rack bar 62 to the right. It is to be noted that the operation and construction of the above mechanism is such that regardless of the length of the feed stroke, the stroke is always completed in the same forward position. This is due to the fact that the connecting member 66 is adjustable along an arc which is concentric with the pivotal connection between the member 66 and the upper rack bar 61 when the slide is in its forward position.

It will be seen from the above description that the present invention provides a multi-spindle machine tool having diametrically opposed stations where the same machining operations can be performed by cutting tools actuated by auxiliary slide mechanisms. The construction and arrangement greatly increases the flexibility and the uses to which the machine may be put by making it feasible to complete two machined articles for each indexing revolution of the spindle drum.

Having thus described my invention, I claim:

1. A mechanism for actuating a plurality of machine tool slides supported by a frame about an axis and movable longitudinally of the axis and for reciprocating a tool supported on one of said slides along a line of movement parallel to said axis comprising a rotatable shaft extending transversely of said axis, individual cam means on said shaft corresponding to each of said slides, individual linkages connecting each of said cam means to actuate its corresponding slide upon rotation of the cam means by said shaft, said linkages each including cam-operated means operable to control the movement of the slide operated thereby in response to the rotation of said cam means, each of said cam-operated means being operated by a cam on said shaft, an auxiliary mechanism for moving a tool on one of said slides relative to the slide comprising a cam on said shaft and rotatable therewith, a lever having one end connectable to a tool on said one of said slides, pivot means for connecting the other end of said lever to said frame to selectively pivot the lever for movement about one of a plurality of pivot points adjacent the other end of the lever and spaced along the length of the lever, said axis of the pivotal movement of said lever extending transversely of the axis about which said slides are disposed, an axially reciprocable rod, and means for pivotally connecting one end of said rod to one of a plurality of second pivot points spaced lengthwise of said lever between said one end and the first-mentioned pivot points, and a cam on said shaft operatively connected to said lever and effecting reciprocation thereof on rotation of said cam.

2. A mechanism according to claim 1 wherein a plurality of auxiliary mechanisms are provided for actuation of tools on respective ones of said slides, each of said auxiliary mechanisms being operated by a cam on said shaft.

3. An auxiliary mechanism for moving a tool along a line of movement relative to a slide supported by a frame comprising a shaft extending transversely of said line of movement, a cam on said shaft and rotatable therewith, a lever having one end connectable to said tool, pivot means for connecting the other end of said lever to said frame to selectively pivot the lever about one of a plurality of pivot points adjacent the other end of the lever and spaced along the length of the lever, said axis of said pivotal movement of said lever extending transversely of said line of movement, an axially reciprocable rod, and means for pivotally connecting one end of said rod to one of a plurality of second pivot points spaced lengthwise of said lever between said one end and the first-mentioned pivot points, and a cam on said shaft operatively connected to said lever and effecting reciprocation thereof on rotation of said cam.

References Cited in the file of this patent

UNITED STATES PATENTS

| | | |
|---|---|---|
| 999,435 | Crell | Aug. 1, 1911 |
| 2,007,564 | Dixon | July 9, 1935 |
| 2,033,490 | Simpson | Mar. 10, 1936 |
| 2,187,682 | Drissner | Jan. 16, 1940 |
| 2,236,440 | Miller | Mar. 25, 1941 |
| 2,621,395 | Miller | Dec. 16, 1952 |
| 2,677,281 | Gibson | May 4, 1954 |
| 2,683,918 | Kohring | July 20, 1954 |
| 2,799,075 | Nichta | July 16, 1957 |